United States Patent [19]
Brosmith et al.

[11] Patent Number: 5,692,607
[45] Date of Patent: Dec. 2, 1997

[54] ARTICLE CONTAINING PROTECTIVE SLEEVE

[75] Inventors: Sean B. Brosmith, Hermosa Beach; Howard E. Sherman, Beverly Hills, both of Calif.

[73] Assignee: Roundhouse Products, Inc., Santa Monica, Calif.

[21] Appl. No.: 747,270

[22] Filed: Nov. 12, 1996

[51] Int. Cl.⁶ .................................................. B65D 85/30
[52] U.S. Cl. .................. 206/308.1; 206/313; 206/776; 206/522; 206/232
[58] Field of Search ........................... 206/775, 776, 206/308.1, 311, 312, 313, 232, 522

[56] References Cited

U.S. PATENT DOCUMENTS

| | | | |
|---|---|---|---|
| 4,499,996 | 2/1985 | Coyle | 206/312 |
| 4,730,727 | 3/1988 | Petroff | 206/311 |
| 4,850,731 | 7/1989 | Youngs | 206/311 |
| 4,977,475 | 12/1990 | Shiba et al. | 206/313 |
| 5,147,036 | 9/1992 | Jacobs | 206/232 |
| 5,421,452 | 6/1995 | Hybiske | 206/312 |
| 5,555,977 | 9/1996 | Oshry et al. | 206/311 |
| 5,556,683 | 9/1996 | Ranalli | 206/311 |

*Primary Examiner*—Paul T. Sewell
*Assistant Examiner*—Nhan T. Lam
*Attorney, Agent, or Firm*—Jack C. Munro

[57] ABSTRACT

The subject invention is an article containing protective sleeve constructed of a sleeve housing which is composed of a plurality of flexible sheet material walls located in juxtaposition with the peripheral edges of the walls being secured together with the exception of a given area defined as the access opening into the internal compartment between the walls. The internal compartment is to be for the purpose of storing an article with at least one sensitive surface. In order to minimize possible damage to that sensitive surface, the wall that is to be in contact with that sensitive surface includes a mass of hiatuses with the hiatuses being arranged to minimize the amount of surface area coming into direct contact with the sensitive surface.

2 Claims, 1 Drawing Sheet

ARTICLE CONTAINING PROTECTIVE SLEEVE

BACKGROUND OF THE INVENTION

1) Field of the Invention

This invention is a storage device for a sensitive surface article such as an audio or video compact disc.

2) Description of the Prior Art

The compact digital audio disc and the digital video disc (CD) have resulted in a true advance in audio and video program playback technology. The CD contains a digitally encoded rendering of the program audio and/or video signal transferred by molding or stamping onto a disc of polycarbonate plastic. The encoded surface is then uniformly coated first with aluminum and then with a sealant such as lacquer. The aluminum sputtering on the stamped surface creates a reflective surface which is read by a laser beam through the opposite side of the polycarbonate disc. The laser reflection is converted to an audio signal and/or a video signal which is to be played within appropriate audio or audio/video playback equipment.

The disc is considered to be a substantial advance over the vinyl record album for several reasons. First the CD is capable of storing considerably more program material per unit area than a vinyl album. This permits the use of a much smaller disc for the presentation of the recorded program (hence the term "compact" disc). Next the ability to retain an audio or a video program capable of being digitally decoded results in significant improvement in the signal-to-noise ratio and program fidelity when being compared to a vinyl record. Finally, the use of a laser beam as the transducer results in little, if any, degradation of the compact disc playing surface during playback. The playback properties of the compact disc will thus remain essentially unchanged even after extensive use.

There are factors, however, which interfere with the reflection of the laser beam from the aluminum sputtered surface and thereby adversely affect CD playback performance. Such factors include scratches, dust and fingerprints. Because of the need to protect the surface of the compact disc through which the laser reflects (the optical surface), various compact disc storage devices have been developed. A common type of a compact disc storage device constitutes a sleeve with this sleeve being constructed of a plurality of thin flexible sheet material walls. Normally the sleeve is transparent, but it also may be opaque. Between the two parallel walls of each sleeve is an internal compartment. The compact disc is to be manually inserted into that internal compartment and when completely contained within the compartment, both surfaces of the compact disc are to be covered by the compartment walls thereby helping to protect the compact disc from dust and direct physical damage such as being scratched by a table, desk or other supporting surface.

The surfaces of a compact disc are so sensitive that even the mere act of repeatedly moving that sensitive surface over the wall surface of the storage sleeve will over a period of time create minor scratches on that sensitive surface. The need therefore exists to modify the commonly used storage sleeves for compact discs so that the wall surface of the sleeve that is located directly adjacent the sensitive surface of the compact disc be constructed in a manner that minimizes contact abrasion to that sensitive surface.

It is to be understood that although this invention is discussed in relation to a compact disc, the concept of this invention could be utilized in conjunction with any type of storage device that is used to store any type of article having at least one sensitive surface. Examples of such articles having sensitive surfaces that are not compact discs include coins and photographs.

SUMMARY OF THE INVENTION

The structure of this invention relates to a flexible walled sleeve which is constructed of at least two walls located in juxtaposition. The peripheral edges of the walls are fixedly connected together with the exception of a given area which comprises the access opening into the internal compartment formed between the walls. At least one of the walls has formed therein hiatuses such as a mass of protuberances or a mass of protuberances combined with a mass of recesses. The article that is to be stored within the sleeve is to be slipped into the internal compartment. The sensitive surface of the article is to be located directly adjacent the wall that contains the hiatuses.

The primary objective of the present invention is to provide a protective sleeve for an article which includes a sensitive surface whereby the sleeve minimizes the amount of surface area that is in direct contact with the sensitive surface thereby minimizing the possibility of damage from scratches of the sensitive surface.

DETAILED DESCRIPTION OF THE PREFERRED EMBODIMENT

Figure 1:
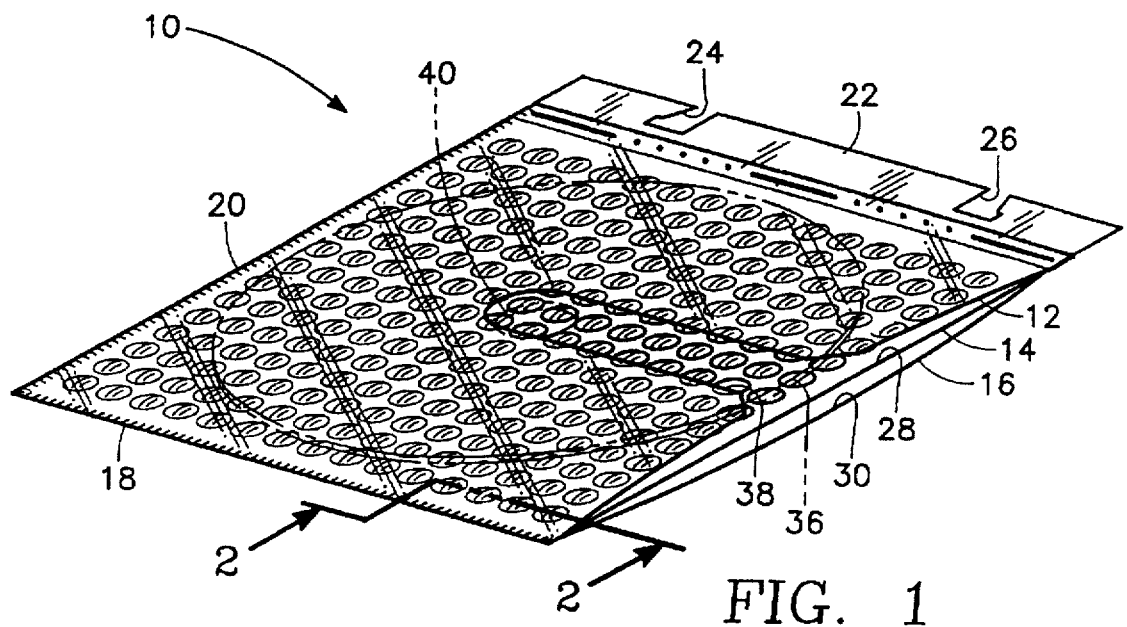
FIG. 1 is an isometric view of the article containing a protective sleeve of the present invention showing the protective sleeve with a series of protuberances in a wall surface that is utilized to store a typical compact disc.

Referring particularly to the drawing, there is shown the article containing protective sleeve 10 of this invention. The sleeve 10 is formed of a plurality of walls such as walls 12, 14 and 16. Normally the walls 12, 14 and 16 will basically be formed from a polypropylene film the thickness of about fifteen mils. Each of the walls 12, 14 and 16 is basically flexible. The walls 12, 14 and 16 can be transparent if desired. The walls 12, 14 and 16 are secured together at the peripheral edges along peripheral edges 18 and 20. The basic configuration of the walls 12, 14 and 16 is that of a polygonal shape with a square configuration being preferred. One portion of the peripheral edge is attached to a rail bar 22 where the rail bar 22 includes rail engaging recesses 24 and 26. These rail engaging recesses 24 and 26 are for mounting of the sleeve 10 onto a pair of spaced apart side-by-side rails of a storage box which is not shown. It is to be understood that the rail bar 22 forms a sealed connection with the walls 12, 14 and 16.

There remains one side edge that is not sealed within the sleeve 10. This one side edge defines an access opening 28 between walls 12 and 14 and an access opening 30 between walls 14 and 16. The access opening 28 provides access into an interior compartment 32 which is located between the walls 12 and 14 with the access opening 30 providing entry into the interior compartment 34 located between the walls 14 and 16. Normally, the interior compartment 34 will be for the purpose of storage of informational means such as a pamphlet.

A compact disc 36 is to be located within the compartment 32 and is completely contained herein with the wall 12 covering the outside surface of the compact disc 36 and the wall 14 covering the inside surface of the compact disc 36. The wall 12 includes slot 38 mounted within the center hole 40 of the compact disc 36 which is to permit access of the user's finger or fingers. In order to eliminate the possibility of fingerprints on the sensitive surface of the compact disc 36, manual movement of the compact disc 36 is accomplished by the user's fingers being located within the center hole 40. Insertion and removal of the compact disc within the compartment 32 is accomplished by the fingers moving into and out of the slot 38 with the fingers engaging center hole 40.

The wall 14 includes a mass of one-fourth inch diameter protuberances 42 one-fourth inch in diameter. Normally the protuberances 42 will completely cover the wall surface 14. The protuberances 42 are basically in the shape of rounded protrusions that extend out about one thirty second of an inch from the surface of the wall 14. There is a gap area of about three thirty seconds of an inch between directly adjacent protrusions 42.

Figure 3:
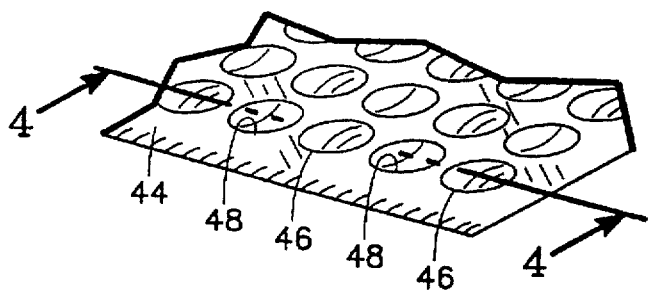
FIG. 3 is an isometric view of a portion of the hiatused wall surface that is included within the protective sleeve of this invention where the hiatused wall surface also includes recesses.
Figure 4:
FIG. 4 is a cross-sectional view taken along line 4—4 of FIG. 3.

Referring particularly to FIGS. 3 and 4, there is shown a wall 44 which is a modified form of the wall 14. Wall 44 has formed therein a series of protuberances 46 and also a series of recesses 48. The recesses 48 will also be of the same diameter as the protuberances 46. There is a recess 48 located in between directly adjacent pairs of protuberances 46. It is to be noted that when observing the opposite surface of the wall 44, the protuberances 46 become recesses and the recesses 48 become protuberances. When observing FIG. 4, the protuberances 46 are in a staggered relationship relative to the wall 44.

Figure 2:
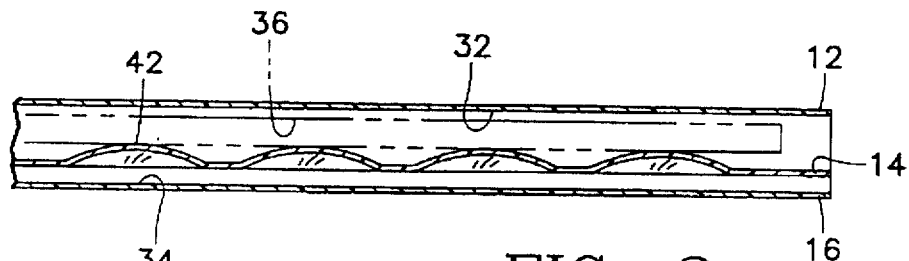
FIG. 2 is a cross-sectional view through the protective sleeve of this invention taken along line 2—2 of FIG. 1.

It is to be understood that when the compact disc 36 is slid through access opening 28 into compartment 32, the sensitive surface of the compact disc 36 is to be located directly adjacent the protuberances 42 of FIGS. 1 and 2 or the protuberances 46 and recesses 48 of FIGS. 3 and 4. The sensitive side of the compact disc 36 only contacts the wall 14 in the area of the protuberances 42 or 46 and actually only at the tip of each protuberance which is in alignment with the center axis of the protuberance (see FIG. 2). This minimizes the amount of surface area that comes into direct contact with the compact disc 36. The amount of surface area that comes into contact with the compact disc 36 is substantially diminished. This small contact area significantly reduces the amount of surface area contacting the compact disc 36 as opposed to if the protrusions had a flat upper surface. Therefore the compact disc 36 can be slid into and out of the compartment 28 a substantially greater number of times with the sensitive side of the disc 36 not sustaining any significant surface scratches that could possibly be incurred with a similar protective sleeve not including the protuberances 42 or 46.

It is to be noted that by using the modifications shown in FIGS. 3 and 4 compartment 30 could also be used to support a compact disc with the sensitive side of the compact disc 36 to be located directly adjacent the recesses 48 which within compartment 38 become protuberances.

What is claimed is:

1. An article containing protective sleeve comprising:

a sleeve housing constructed of a plurality of walls located in juxtaposition, each said wall having a peripheral edge, said walls being fixedly connected together at said peripheral edge with the exception of a portion of said peripheral edge forming an access opening, said walls to be constructed of flexible sheet material, said walls forming an interior compartment, an article adapted to be inserted through said access opening and placed and stored within said interior compartment, the improvement comprising:

at least one of said walls including a mass of protuberances, each said protuberance being rounded producing a center located tip, said article having a sensitive surface, said sensitive surface is to be placed in direct contact with said tips of said protuberances thereby directly exposing the sensitive surface to a diminished amount of surface area as opposed to the entire surface area of said wall located directly against said sensitive surface thereby minimizing possible damage to the sensitive surface.

2. The article containing protective sleeve as defined in claim 1 wherein:

said protuberances being staggered producing non-aligned protuberances relative to said wall.

\* \* \* \* \*